United States Patent [19]
Williams et al.

[11] Patent Number: 5,877,910
[45] Date of Patent: Mar. 2, 1999

[54] DUAL MAGNETIC HEAD AND METHOD FOR WRITING ON VERY HIGH TRACK DENSITY AND CONVENTIONAL TRACK DENSITY FLOPPY DISKS

[75] Inventors: Roger O. Williams, Fremont; Jimmy D. Godwin, San Jose; Stephen P. Williams, San Jose; Mark E. Strysko, San Jose; Alton B. Otis, Jr., San Francisco; Andrew M. Rose, Mountain View, all of Calif.

[73] Assignee: Insite Peripherals, Inc., Boulder, Colo.

[21] Appl. No.: 253,618

[22] Filed: Jun. 3, 1994

Related U.S. Application Data

[60] Continuation of Ser. No. 32,411, Mar. 15, 1993, abandoned, which is a division of Ser. No. 915,032, Jul. 16, 1992, abandoned, which is a continuation of Ser. No. 424,667, Oct. 20, 1989, abandoned.

[51] Int. Cl.⁶ .................................................. G11B 5/596
[52] U.S. Cl. .......................................... 360/66; 360/77.03
[58] Field of Search ................................... 360/119, 121, 360/77.03, 104, 120, 78.05, 66

[56] References Cited

U.S. PATENT DOCUMENTS

| | | | |
|---|---|---|---|
| 2,536,260 | 1/1951 | Burns ....................................... | 360/119 |
| 3,807,043 | 4/1974 | Hikino et al. ........................ | 360/119 X |
| 4,614,986 | 9/1986 | LaBudde ............................... | 360/78.05 |
| 4,633,451 | 12/1986 | Ahn et al. ......................... | 360/77.03 X |
| 4,644,421 | 2/1987 | Miwa et al. ............................... | 360/66 |
| 4,803,571 | 2/1989 | Fujioka et al. .............................. | 360/63 |
| 4,805,051 | 2/1989 | De Marco et al. .................. | 360/121 X |
| 4,814,920 | 3/1989 | Yamano et al. ...................... | 360/104 X |
| 4,928,192 | 5/1990 | Bartlett et al. ....................... | 360/77.08 |
| 4,933,795 | 6/1990 | Nigan ....................................... | 360/121 |
| 4,942,658 | 7/1990 | Vandnais et al. .................... | 360/120 X |
| 4,969,058 | 11/1990 | Williams et al. ..................... | 360/77.03 |
| 5,041,936 | 8/1991 | Hayakawa ............................... | 360/121 |
| 5,084,791 | 1/1992 | Thanos et al. .................... | 360/77.03 X |
| 5,091,808 | 2/1992 | Nigam .................................. | 360/78.05 |
| 5,105,529 | 4/1992 | Yasar et al. ......................... | 360/122 X |

OTHER PUBLICATIONS

IBM Techical Disclosure Bulletin vol. 21, No. 10, Floppy Disc Embossing for Servo Applications, Acosta et al. Mar. 1979.

Koshino et al. "Optical Method of the Head Positioning in Magnetic Disk Systems" 1980 IEEE Trans. on Magnetics vol. MAG–16, No. 5 Sep. 1980.

Schneider, "IBM Technical Disclosure Bulletin" vol. 16 No. 4 pp 1082.

*Primary Examiner*—Andrew L. Sniezek
*Attorney, Agent, or Firm*—Thomas E. Schatzel; Law Offices of Thomas E. Schatzel, A Professsional Corp.

[57] ABSTRACT

A dual magnetic head having a first magnetic core for reading and writing very high track density floppy disks and a second magnetic core for reading and writing conventional track density floppy disks. Neither the first nor the second magnetic cores require the trim erase elements associated with prior art magnetic cores for use with floppy disks. When writing on conventional track density floppy disks, separation between data tracks is achieved by erasing a circular region on a first rotation of the floppy disk, erasing a second region, separated from the first region by a small gap, on a second rotation of the floppy disk, and writing data during a third rotation of the floppy disk centered about the small gap. With very high density floppy disks, data is written directly between optical servo tracks on the floppy disk without use of the two erase steps.

3 Claims, 4 Drawing Sheets

Fig_1

Fig_3

Fig_4 (PRIOR ART)

Fig_2

Fig_5

Fig_6

Fig_7

Fig_8   Fig_9

Fig_10

Fig_11

Fig_14

Fig_15

Fig_12

Fig_13

DUAL MAGNETIC HEAD AND METHOD FOR WRITING ON VERY HIGH TRACK DENSITY AND CONVENTIONAL TRACK DENSITY FLOPPY DISKS

This is a continuation of application Ser. No. 08/032,411 filed on Mar. 15, 1993, now abandoned, which is a divisional of application Ser. No. 07/915,032 filed Jul. 16, 1992, now abandoned, which is a continuation of application Ser. No. 07/424,667 filed Oct. 20, 1989 now abandoned.

BACKGROUND OF THE INVENTION

1. Field of the Invention

The present invention relates to a magnetic head and method for reading and writing information on magnetic media and more particularly to a head having one magnetic core that can read and write very high track density (greater than 1000 TPI) floppy disks and one magnetic core that can read and write conventional track density (less than approximately 135 TPI) floppy disks.

2. Description of the Prior Art

The track density of magnetic storage disks for conventional floppy disk drives is approximately in the range of forty-eight to one hundred thirty-five tracks per inch (TPI). In contrast, optical disk drives are capable of achieving track densities in excess of 15,000 TPI. The higher track densities of optical disk drives are achieved through the use of closed loop optical servos that allow the read/write head to follow data track eccentricities caused by defects in the medium and by disturbances from outside forces. It is well known that the term floppy disk refers to a single disk (i.e. single platter) flexible recording medium.

In rigid type magnetic disk drives, track densities of up to 2100 TPI are presently used. These drives commonly have multiple disks in which both sides are used for data. To achieve the high track density a dedicated surface of one of the disks is used for magnetic track servo information. This surface is then not usable for data storage. Thus, the total capacity of the drive is lessened. The tracking servo information is also capable of being accidentally erased causing loss of access to all data.

Figures 1, 2, 3, 4:
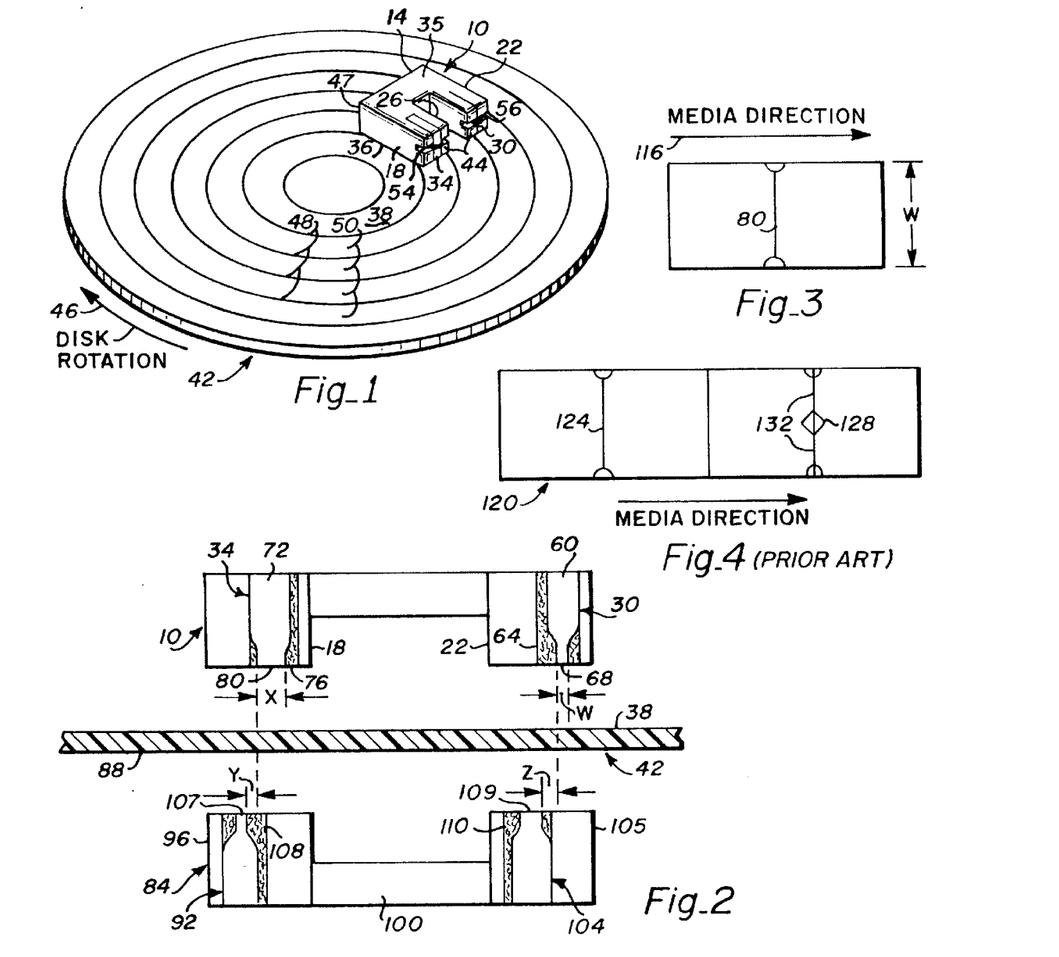
FIG. 1 illustrates a schematic perspective view of a dual magnetic head according to the present invention.
FIG. 2 illustrates a schematic cross-sectional view of a pair of dual magnetic heads according to the present invention and mounted on opposite sides of a floppy disk.
FIG. 3 illustrates a schematic bottom view of a magnetic core according to the present invention.
FIG. 4 illustrates a schematic bottom view of a magnetic core of the prior art.

Various techniques have been reported for using optical means for acquiring track following servo information contained on a magnetic recording medium. For example, Ahn, et al., in U.S. Pat. No. 4,633,451, issued on Dec. 30, 1986 for "Optical Servo For Magnetic Disks", discloses the use of a laser diode to read track following servo information in the form of a plurality of spots contained in an optical layer positioned above a magnetic recording layer. Ahn, et al. also discloses the positioning of two transducers on a slider. In FIG. 4 of the '451 patent, a magnetic recording transducer is shown positioned on one rail of the slider and an optical transducer is shown positioned on the opposite rail.

N. Koshino and S. Ogawa, in "Optical Method of the Head Positioning in Magnetic Disk Systems", preprint from IEEE Transactions on Magnetics (1980), discloses an apparatus for achieving optical servo control in a magnetic disk system which comprises an LED light source and three optical fibers for delivering light to a medium. The three optical fibers are embedded in a hole in the central rail of a Winchester-type ferrite head. The medium comprises a plurality of circular optical tracks, dyed black, and located underneath a magnetic film.

Neither of these references discloses a magnetic head that can be used with both high track density magnetic media and with conventional floppy disks.

SUMMARY OF THE PRESENT INVENTION

It is therefore an object of the present invention to provide a magnetic head that can read and write data on very high and conventional track density floppy disks.

It is another object of the present invention to provide a magnetic head that can read and write data on very high and conventional track density floppy disks and can accommodate optical elements for reading optical servo tracks.

It is another object of the present invention to provide a magnetic head that can read and write data on very high and conventional track density floppy disks and has a simplified structure.

It is another object of the present invention to provide a method for writing information on very high and conventional track density floppy disks.

Briefly, a preferred embodiment of the present invention comprises a dual magnetic read/write head that includes a ceramic head slider having left and right rails. An aperture extends perpendicularly through the horizontal faces of the slider, between the left and right rails, for allowing access to a surface of a floppy disk. The aperture also extends through one of the vertical faces of the slider. The left and right sides of the slider are defined relative to an observer holding the slider with the open vertical face pointing away from the observer.

A very high density ferrite core is positioned on the left rail for reading and writing high track density information on the surface of the floppy disk. A conventional density ferrite core is positioned on the right rail for reading and writing conventional track density information on the floppy disk. The high and conventional track density cores do not include the trim elements found on floppy disk magnetic cores of the prior art, and thus have a simpler design than the prior art cores.

Typically, two magnetic read/write heads, e.g. an upper head and a lower head, are used together so that both sides of the floppy disk can be utilized for information storage. The upper head and lower heads are mounted on an upper head arm and a lower head arm, respectively. A light source and a lens system are positioned on the upper head arm above the upper magnetic head so as to permit optical detection of optical servo tracks, contained on the floppy disk, through the aperture of the upper magnetic head.

A fine position actuator, which includes a voice coil bobbin and the upper and lower head arms, as well as several other elements, is attached to a base carriage whose movement is controlled by a stepper motor. Current flowing in the voice coil bobbin interacts with a magnetic field provided by a magnet attached to the base carriage and causes movement of the fine position actuator relative to the base carriage. A reflective area is positioned on the magnet, which allows a sensor that moves with the fine position actuator, to sense movement of the fine position actuator.

The stepper motor provides coarse positioning of the base carriage over the floppy disk while fine positioning is accomplished via the voice coil motor. With very high track density floppy disks containing optical servo tracks, the optical system comprising the light source, lens, detector, and associated electronics are used to generate a signal which drives the voice coil bobbin and controls the positioning of the fine position actuator. With conventional floppy disks (no optical servo tracks), positioning of the fine position actuator is controlled by the relative distance between the reflective area attached to the magnet and the sensor that moves with the fine position actuator.

In the very high track density mode, data can be written directly at a specified position between a pair of optical servo tracks because of the servo tracking function made possible by the optical servo tracks and the fine position actuator.

Data is written in the conventional track density mode by utilizing a process requiring three revolutions of the floppy disk. On the first revolution, one portion of a data track is erased. On the second revolution, another portion of the data track is erased. On the third revolution, data is written. This procedure eliminates the need for the trim elements found on magnetic cores of the prior art because adequate separation is created between data tracks by the two erase steps.

An advantage of the present invention is that the dual magnetic head can read and write data on both very high track density and conventional track density floppy disks.

Another advantage of the present invention is that optical servo tracks on the surface of a very high density floppy disk can be accessed through the aperture in the magnetic head.

Another advantage of the present invention is that the absence of trim elements simplifies the structure of the dual magnetic head.

Another advantage of the present invention is that a method for writing data on a conventional track density, floppy disk without utilizing trim elements, is presented.

These and other objects and advantages of the present invention will no doubt become obvious to those of ordinary skill in the art after having read the following detailed description of the preferred embodiment(s) which are illustrated in the various drawing figures.

DETAILED DESCRIPTION OF THE PREFERRED EMBODIMENT

FIG. 1 illustrates an upper dual magnetic head, designated by the general reference numeral 10, for reading and writing data on very high or conventional track density floppy disks. The upper dual magnetic head 10 comprises a slider 14, having a right rail 18 and a left rail 22, an aperture 26, positioned between the rails 18 and 22, and a very high density core 30 and a conventional track density core 34 positioned on the left rail 22 and right rail 18, respectively.

In the preferred embodiment, the aperture 26 extends completely through the slider 14, between an upper horizontal face 35 and a lower horizontal face 36, permitting access to a surface 38 of a floppy disk 42. The aperture 26 also extends through a front vertical face 44 of the slider 14 between the right rail 18 and left rail 22. Cores 30 and 34 respectively extend out in slots on opposite sides of aperture 26 through vertical face 44. The floppy disk 42 rotates in the clockwise direction indicated by an arrow 46 with the direction of disk rotation being from a rear vertical face 47 of the slider 14, towards the front vertical face 44. A plurality of optical servo tracks 48 may be positioned on the surface 38 for providing servo positioning information to the dual magnetic head 10. Generally, the optical servo tracks 48 are utilized with very high capacity floppy disks (i.e. floppy disks having more than 1000 data tracks per inch). With conventional track density floppy disks i.e. floppy disks having approximately 48 to 135 tracks per inch), the optical servo tracks 48 are not present and an alternative servo positioning system is utilized. When the optical servo tracks 48 are utilized, the aperture 26 provides a means for accessing the optical servo tracks 48.

The optical servo tracks 48 comprise a plurality of concentric rings with a data storage region 50 existing between each two adjacent optical servo tracks 48. One or more data tracks may be written within one data storage region 50.

A first wire coil 54 and a second wire coil 56 are wound about the conventional track density core 34 and the very high density core 30, respectively.

FIG. 2 shows a cross-sectional view of the upper dual magnetic head 10. The very high density core 30 comprises a ferrite core 60 partially surrounded by a glass filled region 64 which comprises a plurality of low temperature glass particles. The ferrite core 60 is step ground to have a width "w". A read/write gap 68 is positioned on the bottom of the core 60 and has a length equal to the width "x". The conventional track density core 34 comprises a ferrite core 72 partially surrounded by a glass filled region 76 which comprises a plurality of low temperature glass particles. The ferrite core 72 is step ground to have a width "x". A read/write gap 80 is positioned on the bottom of the core 72 and has a length equal to the width "w". In the preferred embodiment, "x"=0.0049 inches and "w"=0.0006 inches.

A lower dual magnetic head 84, similar to the dual magnetic head 10, is positioned underneath the floppy disk 42 for reading and writing magnetic data on a surface 88 of floppy disk 42 opposite to the surface 38. A bottom very high density core 92, identical to the very high density core 30, is positioned on a right rail 96 of a lower slider 100 and a bottom conventional density core 104, identical to the conventional track density core 34, is positioned on a left rail 105 of the lower slider 100. Thus, on the lower magnetic head 84, the high and low density cores 92 and 104 are positioned on opposite rails from the high and low density cores 60 and 72 of the magnetic head 10. Wire coils (not shown) analogous to the coils 54 and 56 are wound around the cores 104 and 92.

The bottom very high density core 92 includes a bottom read/write gap 107 and a glass filled region 108. The bottom conventional density core 104 includes a bottom read/write gap 109 and a glass filled region 110. The bottom cores 92 and 104 are offset from the cores 34 and 30, respectively, by the distances "y" and "z", respectively, so that no overlap occurs between the read/write gaps 80 and 107 and 68 and 109. In the preferred embodiment, y=z is approximately 0.0177 inches. This offset prevents cross talk from occurring between the read/write gaps 80 and 107 and 68 and 109. In the preferred embodiment, the lower dual magnetic head 84 does not require an aperture analogous to the aperture 26. However, an aperture could be utilized with the lower head 84.

FIG. 3 shows a schematic bottom view of the conventional track density core 34. The read/write gap 80 extends perpendicular to the direction of travel of the floppy disk 42 (media direction) as indicated by an arrow 116.

FIG. 4 shows a schematic bottom view of a conventional track density core 120 of the prior art. The prior art core 120 comprises a read/write gap 124, a nonmagnetic ceramic area 128, and a pair of trim erase elements 132.

Figure 5:
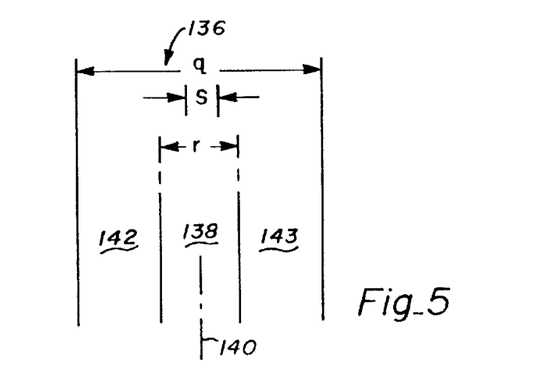
FIG. 5 is a schematic, partial top view of a data track and surrounding regions.

FIG. 5 illustrates a continuous data storage region 136, having a width "q", which is a region of a floppy disk on which data could be written. A data track 138, which comprises written magnetic data is positioned symmetrically about a centerline 140 approximately bisecting the region 136. A pair of erased regions 142 and 143 exist on either side of the data track 138. The erased regions 142 and 143 are separated by a distance "s".

Figure 6:
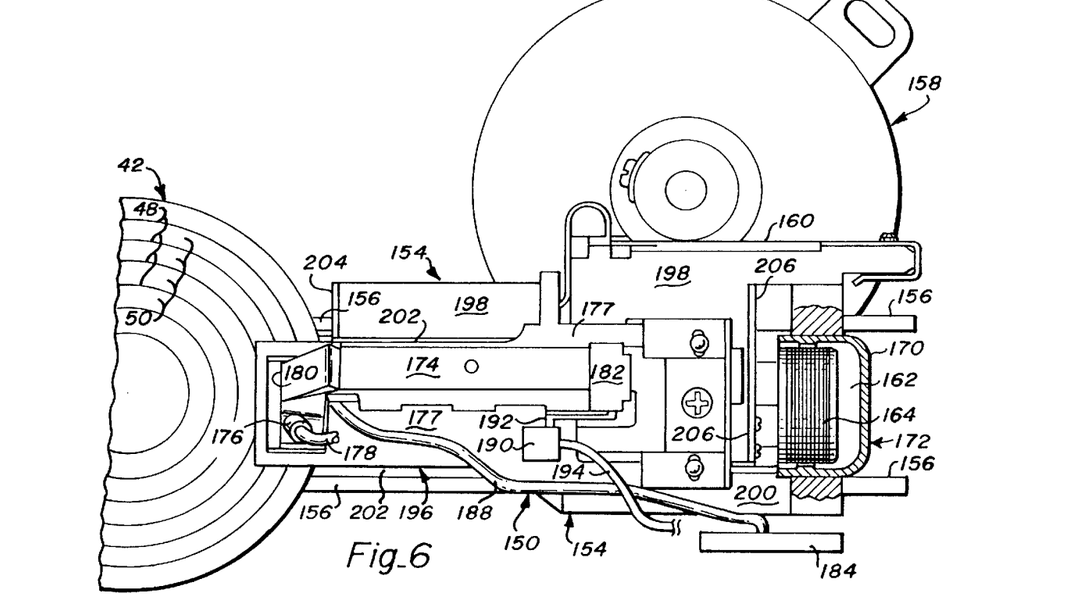
FIG. 6 is a top view of a carriage assembly according to the present invention.

FIG. 6 shows a top view of a carriage assembly designated by the general reference numeral 150. A base carriage 154 is attached to a pair of carriage guide rods 156. A stepper motor 158 is mechanically attached to the base carriage 154 by a stepper actuator band 160. A voice coil magnet 162 is attached to the base carriage 154 and a voice coil bobbin 164 is positoned to electromagnetically interact with the magnet 162. A magnet housing 170 surrounds the magnet 162 and the bobbin 164. The combination of the magnet 162, bobbin 164 and housing 170 comprise part of a voice coil assembly 172.

An optical assembly 174, a light source 176 and the upper dual magnetic head 10 are positioned on an upper head arm 177. Electrical control of the light source 176 is achieved through a lead 178. A lens 180 is positioned at the end of the optical assembly 174 nearest the upper magnetic head 10 and an optical detector 182 is positioned at the other end of the optical assembly 174. A magnetic preamplifer 184 is electrically connected to the magnetic head 10 by a bundle of electrical leads 188. The electrical leads 188 also electrically connect the magnetic preamplifier 184 with signal processing equipment external to the carriage assembly 150. An optical preamplifier 190, positioned on the upper head arm 177, is electrically connected to the optical detector 182 by a plurality of leads 192. A bundle of electrical leads 194 electrically connects the optical preamplifier 190 with external signal processing circuitry.

In the preferred embodiment, the light source 176 comprises an infrared light emitting diode operating in a pulsed mode. The lens 180 comprises a two-sided lens with one side having an aspheric profile and the other side having a spherical profile. The light collection cone of the lens 180 has an F number of F/1.75. The optical detector 182 is a photodetector having four square cells, each of which is a positive intrinsic negative (PIN) photodiode having a responsivity of approximately 0.6 milliamps/milliwatt. Such photodetectors are widely used in the compact disk industry and are available, for example, from Sharp, part number PD164PI or PD167PI. The Sharp photodiode has six cells so the two extra cells are not used.

The upper head arm 177, the voice coil bobbin 164, the optical assembly 174, the light source 176 and the upper magnetic head 10 comprise part of an assembly referred to as a fine position actuator 196. The base carriage 154 comprises a left side member 198 and a right side member 200 with a cavity 202 positioned between the members 198 and 200. The fine position actuator 196 is positioned in the cavity 202 and is mechanically connected to the member 198 by a front flexure 204 and a rear flexure 206. The flexures 204 and 206 provide substantially friction free support for the fine position actuator 196 and in the preferred embodiment, comprise thin flexible pieces of stainless steel. The front flexure 204 is attached between the front of the fine position actuator 196 and the left member 198 and the rear flexure 206 is attached between the rear of the fine position actuator 196 and the left member 198.

Figure 7:
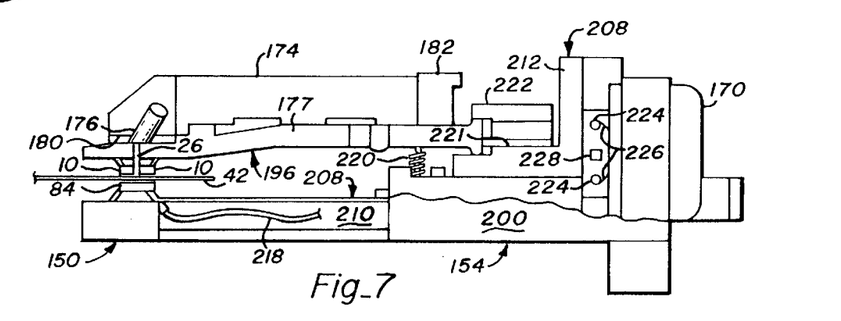
FIG. 7 is a side view of the carriage assembly of FIG. 6.

FIG. 7 is a side view of carriage assembly 150 and shows that the fine position actuator 196 also includes the lower dual magnetic head 84 positioned underneath the disk 42 and the upper head 10. The lower magnetic head 84 is attached to a lower head mount 208 which is sized to slide within the base carriage 154. The lower head mount 208 is one continuous piece that has a bottom part 210 and a top part 212. The lower head mount 208 is part of the fine position actuator 196. In FIG. 7 part of the right side member 200 is cut away so as to clearly show the top part 212. The magnetic preamplifier 184 is electrically connected to the lower head 84 by a bundle of electrical leads 218.

The aperture 26 extends perpendicularly through the upper magnetic head 10 and through the upper head arm 177 so as to provide an optical pathway from the light source 176 and lens 180 to the disk 42. A head load spring 220 and a connecting flexure 221 connect the upper head arm 177 to the lower head mount 208. A flexure clamp 222 is positioned over the connecting flexure 221 for providing support to the arm 177 when the arm 177 is raised for access to the disk 42. This allows the flexure 221 to bend instead of twisting and evenly distributes the load of the flexure 221 to the lower head mount 208. A pair of terminals 224, for accepting a plurality of electrical leads 226 from the voice coil bobbin 164, are positioned about a positioning sensor 228. The sensor 228 comprises a position sensing means, e.g. a Hall effect sensor, a capacitive or inductive pick-up or an optical sensor.

Figure 8:
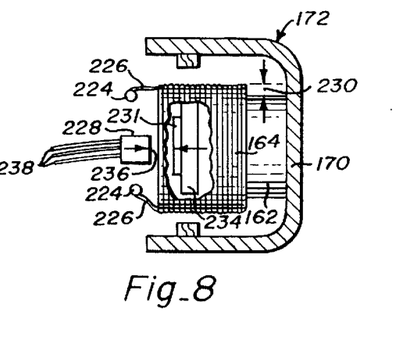
FIG. 8 is a side view of a standard voice coil motor adopted for use with the present invention.

FIG. 8 shows the positions of the sensor 228 and the bobbin 164 in more detail. The voice coil bobbin 164 is wound around the magnet 162 with an air gap 230 existing between the bobbin 164 and the magnet 162. Part of the bobbin 164 is cut away in FIG. 8 to show that a reflective pad 232, e.g. a piece of white polyethylene terephthalate (Mylar) and a magnetic flux field shunt 234 are positioned on an end of the magnet 162, adjacent to the sensor 228. A gap 236 exists between the sensor 228 and the reflective pad 232. In the preferred embodiment, the sensor 228 comprises a commercially available light reflection emitter/sensor which includes an infrared emitter and an NPN phototransistor detector. A plurality of electrical leads 238 are connected to the sensor 228.

Figure 9:
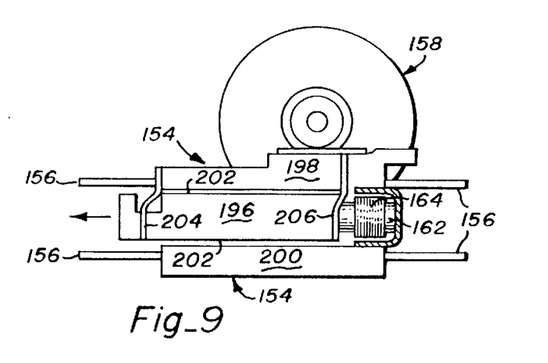
FIG. 9 illustrates the flexures of the carriage assembly of FIG. 6.

FIG. 9 shows the movement of the fine position actuator 196 relative to the base carriage 154. The fine position actuator 196 is shown in an extended position indicating that the actuator 196 has advanced in the direction of the arrow relative to the base carriage 154. As a result of this movement, the front flexure 204 and the rear flexure 206 are distorted or curved. The voice coil bobbin 164, which is part of the fine position actuator 196, moves with the actuator 196. The magnet 162 is attached to the base carriage 154 which travels in the direction of the arrow along the guide rods 156 when actuated by the stepper motor 158.

Figure 10:
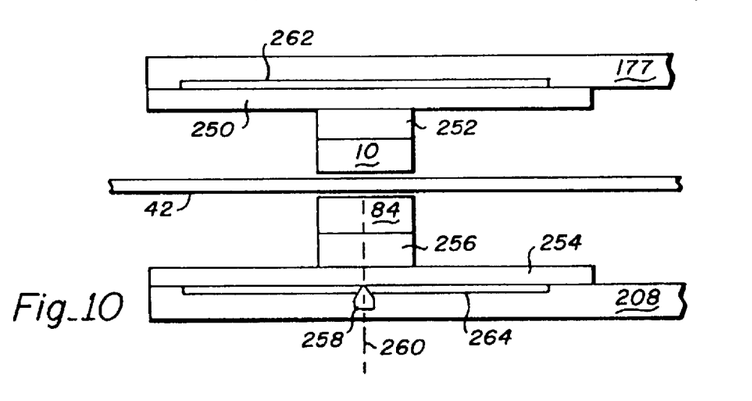
FIG. 10 is a schematic side view of the upper and lower dual heads attached to the upper and lower head arms.

FIG. 10 shows the manner in which the upper magnetic head 10 and the lower magnetic head 84 are attached to the upper head arm 177 and the lower head mount 208, respectively. The upper head 10 is attached to an upper head gimbal 250 by an upper head mount block 252. The lower head 84 is attached to a lower head gimbal 254 by a lower head mount block 256. A load member 258 is positioned near the lower head gimbal 254 approximately along a centerline 260 running through the geometric center of the lower head 84. The gimbals 250 and 254 are thin flexible metal members positioned on the upper head arm 177 and lower head mount 208, respectively. A pair of cavities 262 and 264 extend along the length of the gimbals 250 and 254, respectively, for allowing movement of the gimbals 250 and 254.

The upper head 10 is loaded, by the spring 220 (shown in FIG. 7), to the disk 42, the lower head 84 and the load member 258. The spring rate of the lower gimbal 254 is much less than the spring rate of the upper gimbal 250, thereby allowing the lower head 84 to gimbal or rotate about the load member 258 to comply with the upper head 10. In other words, movement of the upper head 10 causes similar movement in the lower head 84. Thus, the carriage assembly 150 utilizes a fixed or slightly compliant upper head 10 and a compliant lower head 84.

Figure 11:
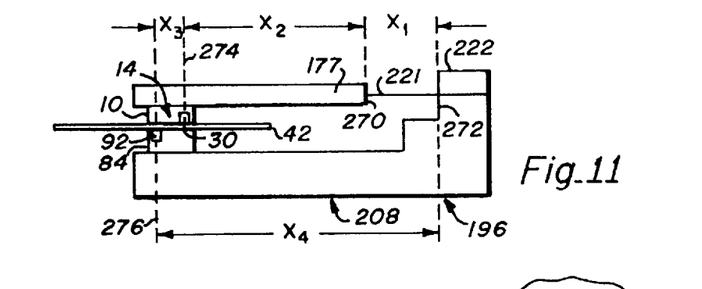
FIG. 11 schematically illustrates a fine position actuator according to the present invention.

FIG. 11 illustrates part of the fine position actuator 196 with a plurality of significant distances marked for reference. The distance $X_1$ is the distance from an end 270 of the upper head arm 177 where the connecting flexure 221 attaches, to a face 272 of the lower head mount 208 where the flexure 221 attaches. Thus, $X_1$ is also the length of the flexure 221 extending between the upper head arm 177 and the lower head mount 208.

The upper head 10 comprises the slider 14, the high density core 30 and the low density core 34. Similarly, the lower head 84 comprises a lower slider 100, the high density core 92 and the low density core 104. The distance $X_2$ is the distance from the end 270 of the upper arm 177 to a read/write centerline 274 which runs through the approximate center of the high density core 30. The distance $X_3$ is the distance between the read/write centerline 274 and a read/write centerline 276 which runs through the approximate center of the high density core 92. The distance $X_4$ is the distance from the face 272 to centerline 276.

Figure 12:
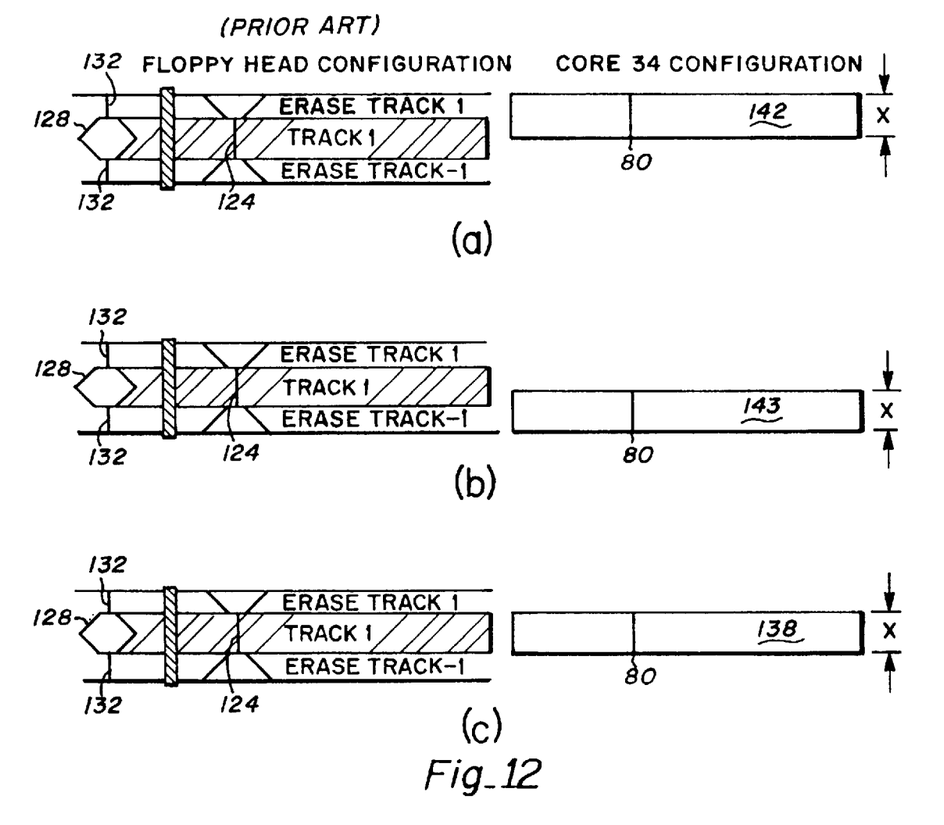
FIGS. 12(a), 12(b) and 12(c) each comparatively illustrate prior art data writing method with corresponding method of the present invention.

FIG. 12 compares the method of writing data using the prior art technique and the method of the present invention. The first column in FIG. 12 shows the elements of the prior art head configuration as previously defined in FIG. 4. Track 1, which is the data track, is written by the read/write gap 124. Erase track 1 and erase track -1 are formed by the trim erase elements 132.

The second column of FIG. 12 illustrates how the data track 138, which is identical to the track 1 data track, is written using the core 34. In step "a", the head 10 is moved so that core 34 is positioned about erase track 1. An erase operation is performed to yield the erased region 142 having the width "x". In step "b", the head is moved so that core 34 is positioned about erase track -1. An erase operation is performed to yield the erased region 143 having the width "x". In step "c", the head 10 is moved so that core 34 is positioned about track 1. A write operation is performed to yield the data track 138 having the width "x".

Figure 13:
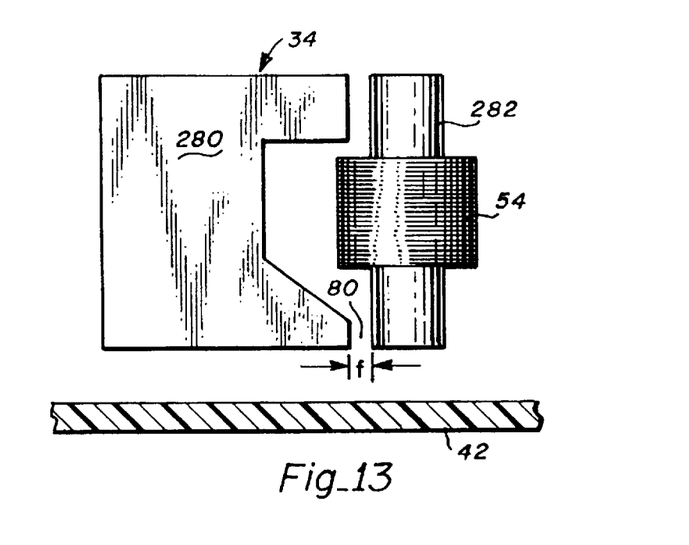
FIG. 13 illustrates a magnetic core.

FIG. 13 illustrates the core 34 in more detail (the cores 30, 92 and 104 have the same structure as is shown in FIG. 13).

The core 34 comprises a C-bar 280 and an I-bar 282. The read/write gap 80 separates the C-bar 280 and the I-bar 282. The first wire coil 54 is wound around the I-bar 282. An indented region 284 is positioned on the C-bar 280 to accomodate the coil 54 which extend into the indented region 284. The gap 80 has a width "f" of approximately forty microinches. The corresponding width of the gap 68 is approximately thirty microinches.

The reading and writing functions of the read/write gap 80 are accomplished by a magnetic field set up in the gap 80 when current flows through the coil 54.

Figure 14:
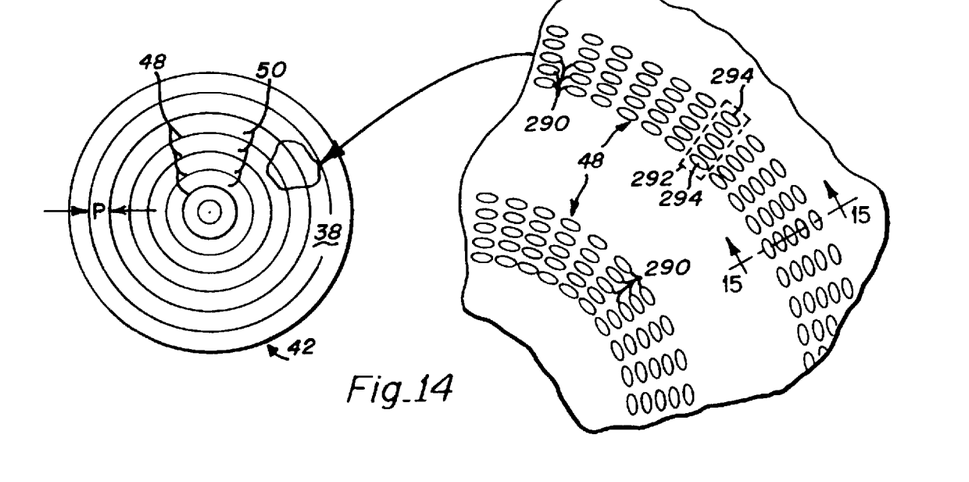
FIG. 14 illustrates a schematic top view of a flexible magnetic disk containing optical servo tracks.

FIG. 14 shows, in more detail, the flexible magnetic disk 42 containing the plurality of optical servo tracks 48 and the plurality of data recording regions 50. The optical servo tracks 46 are arranged in equally spaced concentric circles on the surface 38. Each of the optical servo tracks 48 are comprised of a plurality of pits 290 shown in the expanded portion of FIG. 12. In the preferred embodiment, the pits 290 are elliptical in shape and are arranged in a plurality of rows 292, with each row 292 including five of the pits 290. Each row 292 includes a pair of outside pits 294 which mark the beginning and end of a row 292. The number of pits per row or the shape of the pits may vary with the particular use requirements of the magnetic disk 42.

The flexible magnetic disk 42 is a standard floppy disk to which the optical servo tracks 48 have been added. The data recording regions 50 are areas on the disk 42 circumscribed on two sides by separate optical servo tracks 46. Depending on the application, one or more magnetic data tracks can be recorded on each of the data recording regions 50.

Figure 15:
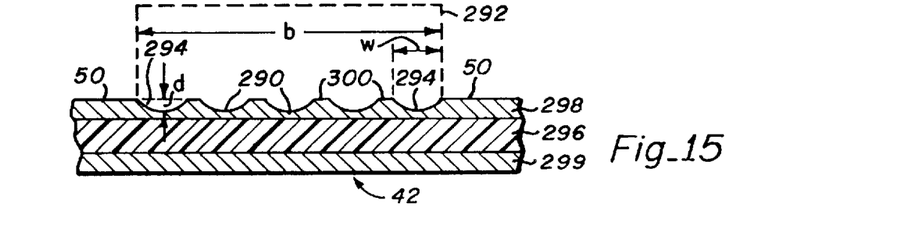
FIG. 15 illustrates a cross-sectional view taken along the line 15—15 of FIG. 14.

FIG. 15 shows a cross-sectional view of one of the rows 292. The magnetic disk 42 is comprised of a polyethylene terephthalate (Mylar) substrate layer 296 coated with an upper magnetic recording layer 298 and a lower magnetic recording layer 299. In the preferred embodiment the magnetic layers 298 and 299 comprise barium ferride but could also be γ- ferric oxide.

The pits 290 are depressed regions in the surface 38. The pits 290 have a maximum depth "d" and a width "w". Typically, the depth "d" is chosen so that the pits 290 do not extend completely through the magnetic recording layer 298. A plurality of smooth regions 300 surround each of the pits 290. The smooth regions 300 are part of the surface 38 and reflect light better than the pits 290. With the outside pits 294, the smooth region 300 is continuous with the data recording region 50 as illustrated in FIG. 14. Each row 292 includes five pits and has a width "b". In the preferred embodiment, the depth "d" is approximately 20 microinches, the width "w" is approximately 30 microinches, and the width "b" is approximately 180 microinches. The separation between the optical servo tracks 48 ("p" in FIG. 14) is approximately 800 microinches.

Referring to FIG. 1, the functioning of the dual magnetic head 10 is as follows. When a high capacity floppy disk having optical servo tracks is used, the high density core 30 is utilized to read and write data on the data recording regions 50. When a conventional track density floppy disk is used, i.e. without optical servo tracks, the low density core 34 is utilized to read and write data on the surface 38.

In the conventional track density mode, data is written in the following manner. On the first revolution of the disk 42, the first erased region 142, having the width "x" (see FIG. 2), is erased. The head 10 is then displaced slightly and on a second revolution of the disk 42, the second erased region 143, having the width "x", is erased. The first and second erased regions are separated by the distance "s" (see FIG. 5).

Typically, "s" is about two mils. The head 10 is then displaced again so as to align the cores 34 or 104 with the centerline 140 of the continuous data storage region 136. On the third revolution of the disk 42, the data track 138, having a width "x", is written about the centerline 140. The erased regions 142 and 143 separate individual data tracks 138. With magnetic cores of the prior art, the erased regions 142 and 143 are formed using the trim erase elements 132 shown in FIG. 4.

Referring to FIG. 6, the functioning of the carriage assembly 150 is as follows. Magnetic data stored on the data storage areas 50 is read and/or written by the upper and lower magnetic heads 10 and 84. The magnetic preamplifier 184 amplifies the signals detected by the magnetic heads 10 and 84, respectively, and directs the amplified signal to external electrical processing circuitry.

The stepper motor 158 functions to provide coarse positioning of the carriage assembly 150 over the disk 42. The stepper motor 158 moves the base carriage 154 along the guide rods 156 in discrete increments or steps of approximately 0.1875 millimeters per step. The voice coil assembly 172 provides the fine positioning function by driving the fine position actuator in a 0.040 inches nominal stroke (i.e., 0.020 inches in either the forward or backward direction). Precise positioning of the upper magnetic head 10 over one of the data storage areas 50 is accomplished by an optical servo tracking procedure. Light from the light source 176 (e.g. an infrared light emitting diode) passes through the aperture 26, is reflected off the disk 42 and is directed onto the lens 180 after passing back through the aperture 26. Less light is reflected by the servo tracking areas 48 than by the data storage areas 50 creating a light pattern of alternating light and dark areas. The light reflected onto the lens 180 is routed through the optical assembly 174 to the detector 182 where the light pattern is detected. Processing of the light pattern, through the optical preamplifier 190 and external electronic circuitry, yields a control signal which is routed to the voice coil bobbin 164 as current flow. Current flowing in the bobbin 164, in the presence of a magnetic field generated by the magnet 162, produces an electromotive force which moves the fine position actuator 196. The bobbin 164 is free to move relative to the magnet 162 because of the air gap 230.

In the very high track density mode, servo positioning of the head 10 is accomplished using the optical servo tracks 48 as was just described. Using this optical servo tracking method, the read/write gap 68 is positioned over a data storage region 50 and data is written or read.

When the stepper motor 158 is driving the base carriage 154, positioning control of the fine position actuator 196 via the optical assembly 174 is not desired. In this situation, the positioning sensor 228 is utilized to control movement of the actuator 196. The sensor 228 is attached to the fine position actuator 196 while the reflective pad 232 is attached to the shunt 234 which is attached to the magnet 162 and moves with the base carriage 154. Referring to FIG. 7, when the actuator 196 moves relative to the pad 232, the gap 236 changes. Light emitted from the sensor 228 is reflected off the pad 232 and is collected by the sensor 228 and is converted to a gain signal. The amplified gain signal is routed to the bobbin 164 which controls movement of the actuator 196 as described previously. The pad 232 is chosen so that a linear reflectance signal is obtained over a range of distances for the gap 236 of approximately 0.075 inches.

Referring to FIG. 9, it can be seen that the fine position actuator 196 can move both with the base carriage 154 and independent of the base carriage 154 because of the flexures 204 and 206. The connecting flexure 221, shown in FIG. 6, allows the upper head arm 177 to be raised so that the disk 42 can be inserted between the upper head 10 and the lower head 84.

In the conventional track density write mode, data is written using the three-step procedure described with reference to FIGS. 5 and 12. Because the optical servo tracks 48 are not present on conventional track density floppy disks, a different method for positioning the head 10 is required. To perform this function, the stepper motor 158 is used to position the core 34 at an initial position. The fine position actuator 196 moves the head 10 to a first position (for example, the erase track 1 position in FIG. 12). After the first erase step, the fine position actuator 196 moves the head 10 (and core 34) to a second position (for example, the erase track -1 position in FIG. 12) and the second erase function is performed. The fine position actuator then moves the head 10 (and core 34) to a third position (for example, the track 1 position of FIG. 12) and the data writing function is performed. The positioning sensor 228 is utilized to control the positioning of the fine position actuator 196 for the first and second erase steps and for the data writing step.

The lower head 84, shown in FIG. 7, is dependent on the upper head 10 for servo tracking information. Positioning of the lower head 84 over data storage areas on the disk 42 is possible because the separation between the high density core 30 and the bottom high density core 92 (the distance $X_3$ shown in FIG. 11) is known. The elements 30 and 92 are the components of the heads 10 and 84, respectively, that actually read and/or write magnetic data. Because the head 84 is attached to the lower head mount 208, which is part of the fine position actuator 196, the head 84 can be positioned relative to the disk 42 by utilizing servo tracking information from the optical assembly 174.

Because the separation distance p (shown in FIG. 14) on the disk 42 is very small, extra measures must be taken in constructing the carriage assembly 150 to ensure that accurate positioning of the magnetic heads 10 and 84 over the disk 42 will be possible. Specifically, the effects of thermal and hygroscopic expansion of the materials in certain elements of the fine position actuator 196 and the disk 42 must be accounted for. Consideration of the distances $X_1$, $X_2$, $X_3$ and $X_4$ shown in FIG. 11 yields a method for nullifying the effects of thermal and hygroscopic expansion. Each of the members which are spanned by one of the distances $X_1$, $X_2$, $X_3$ or $X_4$ are constructed from materials such that equation (1) below is satisfied.

$$X_1(a_1+b_1)+X_2(a_2+b_2)+X_3(a_3+b_3)+X_3(a_5+b_5)=X_4(a_4+b_4) \quad (1)$$

where a=coefficient of thermal expansion; and b=coefficient of hygroscopic expansion.

The subscripts after an individual parameter a or b in equation (1) indicate that the coefficient for the material that comprises the member spanned by the distance X bearing the same subscript is indicated. For example, the term $X_1(a_1+b_1)$ means that the length of the flexure 221 is multiplied by the sum of the coefficients of thermal and hygroscopic expansion for the material from which the flexure 168 is comprised. Additionally, the $(a_3+b_3)$ term refers to the length of the disk 42 spanned by the distance $X_3$ and the $(a_5+b_5)$ term refers to the lengths of the upper head slider 14 and the lower head slider 100 spanned by the distance $X_3$. It should be noted that upper head gimbal 250 and the lower head gimbal 254 (shown in FIG. 10) are comprised of material chosen so that the effects of thermal and hygroscopic expansion due to the gimbals 250 and 254 are eliminated from equation (1). In the most general case, a term for expansion of the gimbals 250 and 254 should be added to equation (1).

In the preferred embodiment, the flexture 168 comprises chromium-nickel austenitic steel (AISI Type 301/302). The upper head arm 166 (the $X_2$ term) and the lower head mount 208 (the $X_4$ term) comprise thirty percent carbon fiber filled polycarbonate. The disk 42 (the $X_3$ term) comprises polyethylene terephthalate (Mylar). The gimbals 250 and 254 are comprised of chromium-nickel austenitic steel (AISI Type 301/302).

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A method for writing separated, concentric data tracks on a floppy disk with a magnetic core with a write element and no separate trim erasure elements, the method comprising:

determining whether a high-capacity floppy disk with optical servo tracks is present or a lower-capacity floppy disk without optical servo tracks is present, and if said high-capacity floppy disk is present, restricting the subsequent steps of positioning such that a subsequent step of reading or writing data is limited to data recording areas between said optical servo tracks;

positioning a magnetic core in a first radial position relative to a surface of a rotating floppy disk on a first revolution by use of both a stepper motor attached to a base carriage that carries said magnetic core on a fine position actuator attached to a voice coil motor, wherein a positioning sensor attached to said fine position actuator and a reflective pad attached to a shunt attached to a magnet that moves with said base carriage is utilized to control movement of said fine position actuator and when said fine position actuator moves relative to said reflective pad to reflect light emitted from said positioning sensor off said reflective pad to be collected by said positioning sensor and converted to a signal which controls movement of said fine position actuator, and wherein said reflective pad provides a linear reflectance signal over a range of approximately 0.075 inches;

creating a first erased region on said floppy disk surface by operating a write element of the magnetic core in an erase mode while the magnetic core remains in said first radial position and said floppy disk is rotated through at least part of one whole rotation of said floppy disk;

moving the magnetic core to a second radial position neighboring said first radial position on a second revolution of said floppy disk approximately two mils from said first position with said voice coil motor wherein said fine position actuator moves relative to said base carriage;

creating a second erased region longitudinally aligned with and radially displaced from said first erased region, by operating said write element in an erase mode while the magnetic core remains in said second radial position and said floppy disk is rotated through said revolution of said floppy disk;

moving the magnetic core to a third position on a third revolution of said floppy disk with said position sensor and said voice coil motor to position said fine position actuator relative to said base carriage, wherein said write element of the magnetic core is radially aligned midway between said first and second erased regions; and writing a track of data longitudinally aligned with and between said first and second erased regions that overwrites a radial portion of both said first and second erased regions, wherein a pair of erased blank areas result on either radial side of said written data track that are each radially narrower than said written data track and separate said written data track from any adjacent data tracks.

2. A method for writing data on either conventional track density floppy disks and on very high track density floppy disks which comprises:

determining whether a high-capacity floppy disk with optical servo tracks is present or a lower-capacity floppy disk without optical servo tracks is present, and if said high-capacity floppy disk is present, restricting the subsequent steps of positioning such that a subsequent step of reading or writing data is limited to data recording areas between said optical servo tracks;

positioning a magnetic head comprising a first core and a second core relative to a surface of a floppy disk with a combination of a fine position actuator and stepper motor attached to a base carriage, wherein a positioning sensor attached to a fine position actuator and a reflective pad attached to a shunt attached to a magnet that moves with a base carriage is utilized to control movement of said fine position actuator and when said fine position actuator moves relative to said reflective pad to reflect light emitted from said positioning sensor off said reflective pad to be collected by said positioning sensor and converted to a signal which controls movement of said fine position actuator, and wherein said reflective pad provides a linear reflectance signal over a range of approximately 0.075 inches;

writing data between a pair of optical servo tracks with said first core if said floppy disk comprises a floppy disk having a system of optical servo tracks; and writing data with said second core if said floppy disk comprises a floppy disk without a system of optical servo tracks.

3. The method of claim 2 wherein the step of writing data with said second core comprises:

positioning said second core in a first radial position relative to a surface of said conventional track density floppy disk;

creating a first erased region by operating a write element of said second core in an erase mode while said second core remains in said first radial position and said conventional track density floppy disk is rotated through at least part of one rotation;

moving said second core to a second radial position;

creating a second erased region adjacent to said first erased region, by operating said write element in an erase mode while said second magnetic core remains in said second radial position and said conventional track density floppy disk is rotated through at least part of one rotation;

moving said second core to a third position where said write element of said second core is aligned between said first and second erased regions; and writing information on said conventional track density floppy disk by operating said write element of said second core in a write mode while said conventional track density floppy disk is rotated through at least part of one whole revolution.

* * * * *